(12) United States Patent
Gau et al.

(10) Patent No.: US 10,944,592 B2
(45) Date of Patent: *Mar. 9, 2021

(54) METHOD FOR DATA TRANSMISSION AND RECEPTION OF RANDOM ACCESS PROCEDURE

(71) Applicant: MEDIATEK INC., Hsin-Chu (TW)

(72) Inventors: Guo-Hau Gau, Hsinchu (TW); Chiou-Wei Tsai, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,943

(22) Filed: Apr. 24, 2019

(65) Prior Publication Data

US 2019/0253281 A1  Aug. 15, 2019

Related U.S. Application Data

(63) Continuation of application No. 15/861,687, filed on Jan. 4, 2018, now Pat. No. 10,313,158.

(60) Provisional application No. 62/443,841, filed on Jan. 9, 2017.

(51) Int. Cl.
| | |
|---|---|
| *H04L 25/02* | (2006.01) |
| *H04L 5/00* | (2006.01) |
| *H04W 56/00* | (2009.01) |
| *H04J 13/00* | (2011.01) |
| *H04W 72/04* | (2009.01) |

(52) U.S. Cl.
CPC ............ *H04L 25/0202* (2013.01); *H04L 5/00* (2013.01); *H04L 5/0007* (2013.01); *H04L 25/02* (2013.01); *H04L 25/0224* (2013.01); *H04W 56/00* (2013.01); *H04W 56/005* (2013.01); *H04W 56/0015* (2013.01); *H04J 13/0003* (2013.01); *H04W 72/0413* (2013.01)

(58) Field of Classification Search
None
See application file for complete search history.

(56) References Cited

U.S. PATENT DOCUMENTS

| | | | | |
|---|---|---|---|---|
| 10,313,158 | B2 * | 6/2019 | Gau | .......................... H04L 5/00 |
| 2008/0273482 | A1 | 11/2008 | Lee | |
| 2015/0011215 | A1 | 1/2015 | Uemura | |

(Continued)

FOREIGN PATENT DOCUMENTS

| | | |
|---|---|---|
| CN | 102448182 B | 6/2016 |
| EP | 2 757 851 A1 | 7/2014 |
| WO | 2015/000134 A1 | 1/2015 |

OTHER PUBLICATIONS

CATT, Discussion of Simplified RACH Procedures, 3GPP TSG RAN WG1 Meeting #87, R1-1611376, Reno, USA, Nov. 14-18, 2016, XP051175357.

(Continued)

*Primary Examiner* — Anh Vu H Ly
(74) *Attorney, Agent, or Firm* — Winston Hsu

(57) ABSTRACT

A method for data transmission of a random access procedure for a user equipment of a wireless communication system is disclosed. The method comprises transmitting a preamble and data of the random access procedure in one message to a network of the wireless communication system, wherein the step of transmitting the preamble and the data comprises transmitting the data with the same numerology as that of the preamble.

13 Claims, 10 Drawing Sheets

(56) References Cited

U.S. PATENT DOCUMENTS

| | | |
|---|---|---|
| 2015/0289292 A1 | 10/2015 | Sun |
| 2017/0111932 A1 | 4/2017 | Uemura |
| 2018/0027594 A1 | 1/2018 | Nagaraja |
| 2018/0110074 A1 | 4/2018 | Akkarakaran |
| 2018/0139787 A1 | 5/2018 | Islam |
| 2018/0146498 A1 | 5/2018 | Sahlin |
| 2018/0235013 A1* | 8/2018 | Jung .................... H04W 16/28 |
| 2019/0281635 A1* | 9/2019 | Kwak ............... H04W 74/0833 |
| 2019/0320467 A1* | 10/2019 | Freda .................... H04L 5/0055 |
| 2019/0387550 A1* | 12/2019 | Pan ................... H04W 74/0833 |

OTHER PUBLICATIONS

Samsung, Basic channel structure for grant-free based multiple access, 3GPP TSG RAN WG1 Meeting #87, R1-1612572, Reno, Nevada, USA, Nov. 14-18, 2016, XP051176517.

Mediatek Inc., Considerations on 2-step RACH physical channel design, 3GPP TSG RAN WG1 Meeting #87, R1-1612142, Reno, USA, Nov. 14-18, 2016, XP051190315.

MediaTek Inc., On 2-step random access procedure and physical channel in NR, 3GPP TSG RAN WG1 Meeting #87, R1-1700172, Jan. 16-20, 2017, Spokane, USA, XP051202677.

* cited by examiner

METHOD FOR DATA TRANSMISSION AND RECEPTION OF RANDOM ACCESS PROCEDURE

CROSS REFERENCE TO RELATED APPLICATION

This application is a continuation of U.S. application Ser. No. 15/861,687 filed on 2018 Jan. 4, which claims the benefit of U.S. Provisional Application No. 62/443,841, filed on 2017 Jan. 9.

BACKGROUND

Random access channel (RACH) of the long term evolution (LTE) system is used for initial network access and uplink timing synchronization. Unlike the legacy 4-step RACH procedure, a 2-step RACH procedure has been discussed in 3GPP standardization meetings for 5G. Note that, compared with the 4-step RACH procedure in the LTE, the simplified 2-step RACH procedure reduces signaling overhead and transmission latency.

Please refer to FIG. 1, which is a schematic diagram of 2-step RACH procedure. In the first step, the UE transmits preamble along with RACH data to the network (i.e. with the message Msg 1). In the second step, the UE receives RACH response including detected preamble index, UE identity, timing advance (TA) from the network (i.e. with the message Msg 2). In other words, the 2-step RACH procedure allows the UE to transmit both preamble and data on the RACH, whereas the 4-step RACH procedure allows the UE to transmit only preamble on the RACH. As a result, the 2-step RACH procedure is beneficial to small-packet uplink transmissions.

However, there is no specification for physical channel design for the 2-step RACH procedure. In detail, demodulation reference signal (DMRS) allocation and numerology/format for RACH data transmission in the message Msg 1 is not considered in the LTE specification. Thus, the network cannot extract/decode the RACH data received from the UE in the 2-step RACH procedure.

SUMMARY

It is therefore an objective to provide a method for data transmission and reception of 2-step random access procedure in order to solve the abovementioned problems.

The present invention discloses method for data transmission of a random access procedure for a user equipment of a wireless communication system. The method comprises transmitting a preamble and data of the random access procedure in one message to a network of the wireless communication system, wherein the step of transmitting the preamble and the data comprises transmitting the data with the same numerology as that of the preamble.

The present invention discloses a method for data transmission of a random access procedure for a user equipment of a wireless communication system. The method comprises transmitting a preamble and data in one message of the random access procedure with configured DMRS sequences with code-division multiplexing (CDM) manner in at least a frequency resource and time resource, to a network of the wireless communication system, wherein the configured DMRS sequences do not consider propagation delay for the RACH data transmission.

The present invention discloses a method for data transmission of a random access procedure for a user equipment of a wireless communication system. The method comprises transmitting a preamble and data in one message of the random access procedure with configured DMRS sequences, to a network of the wireless communication system, wherein a timing advance is compensated so that a density of the configured DMRS sequences becomes less than that before the compensation.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
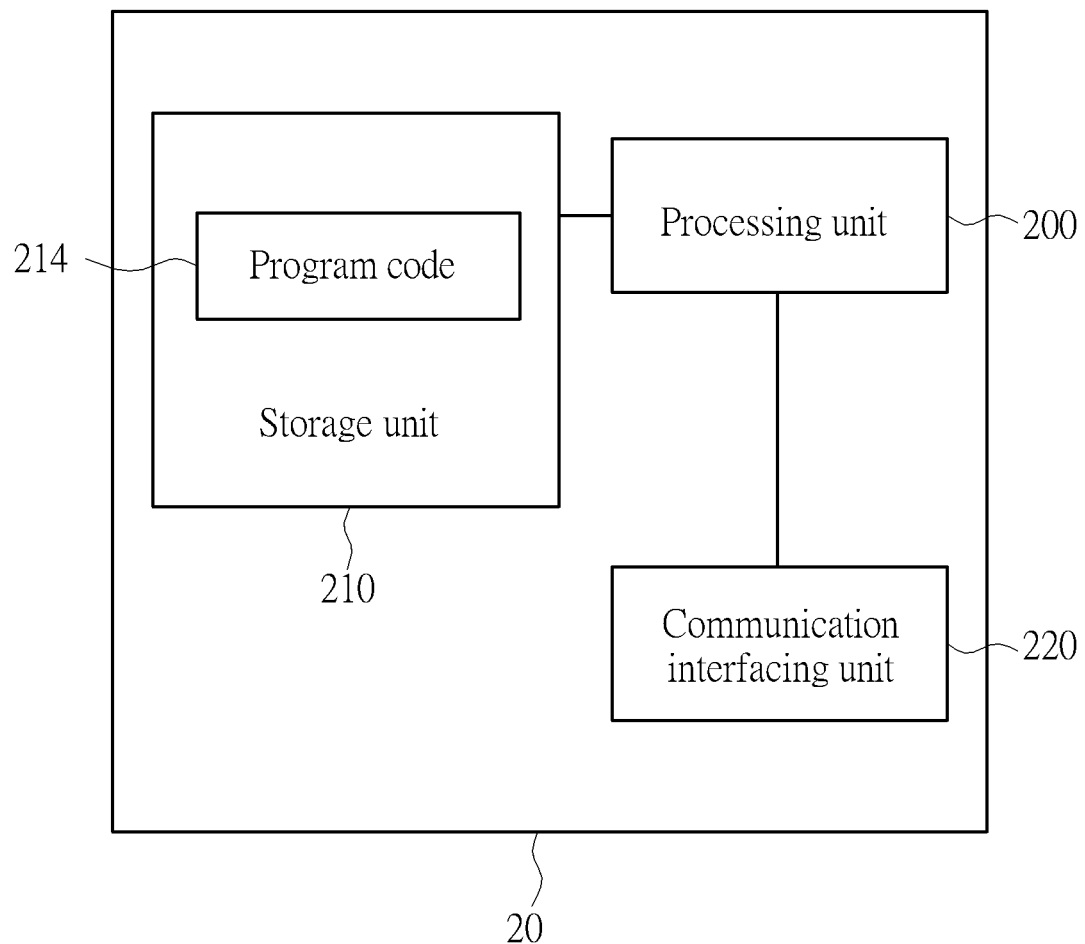
FIG. 2 is a schematic diagram of an exemplary communication device according to the present disclosure.

FIG. 2 illustrates a schematic diagram of an exemplary communication device 20. The communication device 20 can be a network (e.g. a base station) or a user equipment (UE), such as wearable devices, IoT devices, mobile phones, appliances, machine type devices, etc. compatible with LTE or 5G new radio (NR) specification. The communication device 20 may include a processing unit 200 such as a processor, Application Specific Integrated Circuit (ASIC), etc., a storage unit 210 and a communication interfacing unit 220. The storage unit 210 may be any data storage device that can store program code 214 corresponding to a process, for access by the processing unit 200. The processing unit 200 may be coupled to the storage unit 210, for processing the program code 214 to execute the process. Examples of the storage unit 210 include but are not limited to a read-only memory (ROM), flash memory, random-access memory (RAM), CD-ROMs, magnetic tape, hard disk, and optical data storage device. The communication interfacing unit 220 may be a radio transceiver and can exchange wireless signals according to processing results of the processing unit 200.

Figure 1:
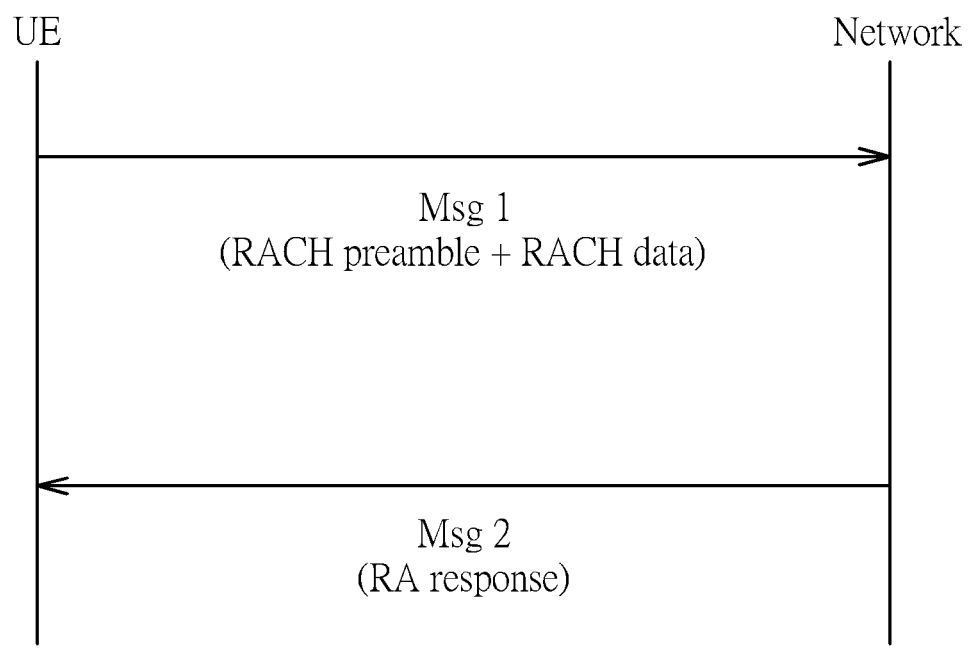
FIG. 1 is a schematic diagram of a 2-step RACH procedure.

Referring back to FIG. 1, the UE transmits not only RACH preamble but also RACH data by the message Msg 1 of the 2-step RACH procedure. For RACH data transmission, the UE uses the same cyclic prefix (CP) and guard time (GT) as for the RACH preamble. In a word, the UE transmits the RACH data with the same numerology and format as for the RACH preamble in physical random access channel (PRACH). In addition, a subcarrier spacing (SCS) of the RACH data is the same as or different from the RACH preamble.

Figure 3:
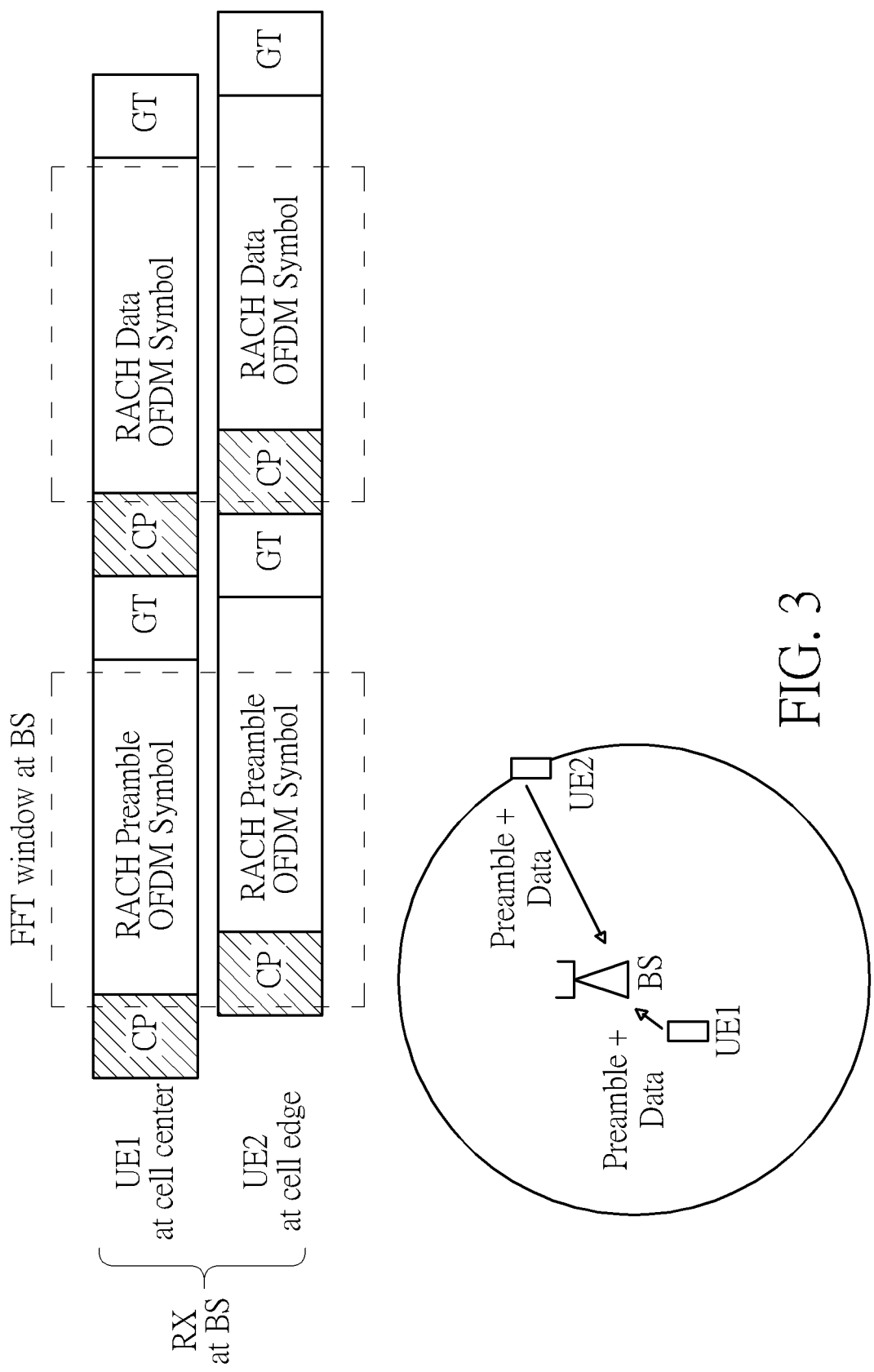
FIGS. 3-4 are schematic diagrams of a numerology and format of RACH data according to the present disclosure.
Figure 4:
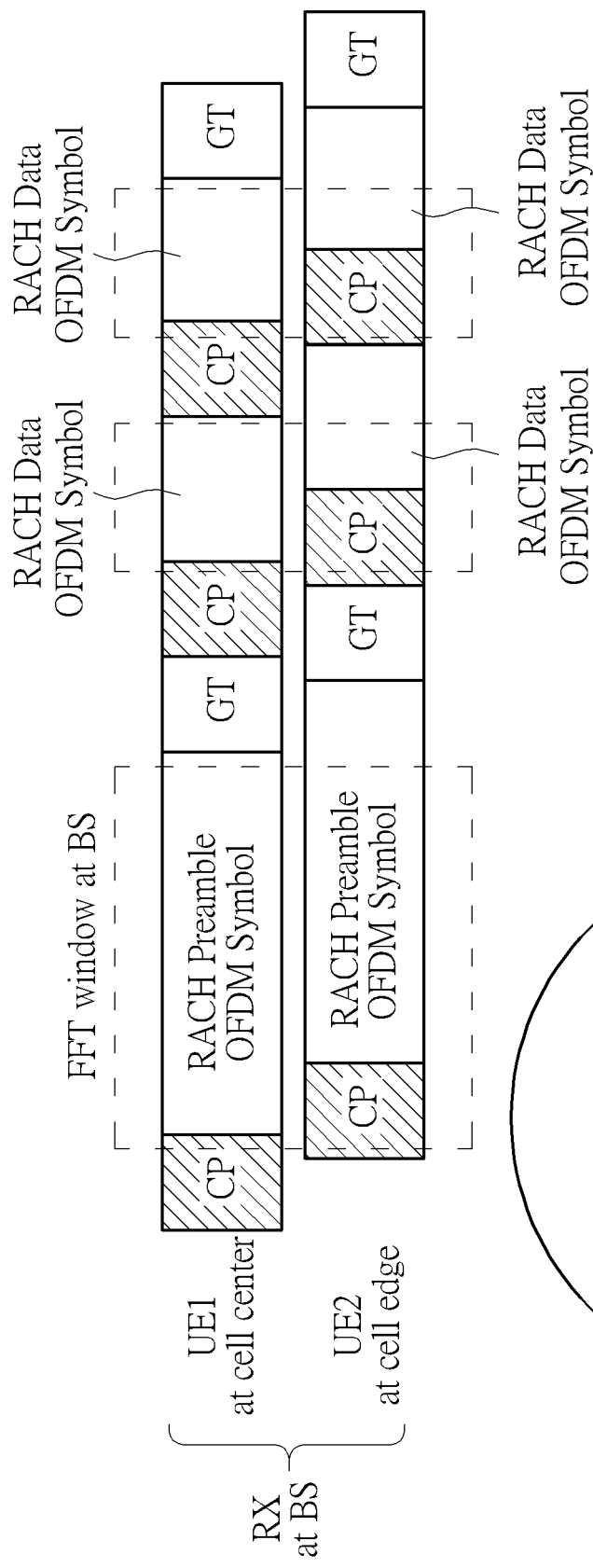
Figure 4:
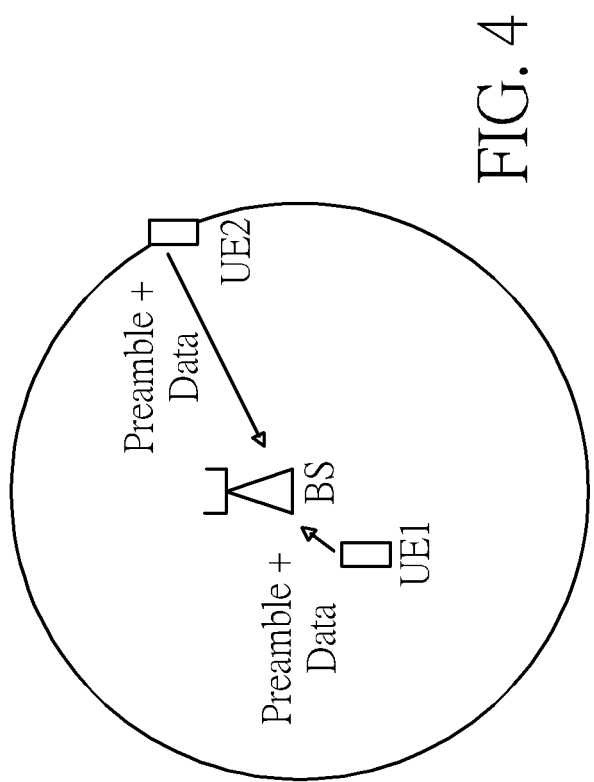

FIGS. 3-4 illustrate numerologies and formats of RACH data according to the present disclosure. In an embodiment, the UE1 and UE2 transmit RACH preambles and RACH data respectively to the base station BS. The UE1 is at cell center and the UE2 is at cell edge, and thus the base station BS receives the RACH preamble and RACH data from the UE1 earlier than the RACH preamble and RACH data from the UE2. In FIG. 3, the RACH data has the same SCS, CP and GT as the RACH preamble, to support RACH data transmission in asynchronous scenario. That is, the UE and the network are not synchronous since the 2-step RACH procedure has not finished, namely the UE have not received the RACH response from the network yet. On the other hand, in FIG. 4, the RACH has different SCS from the RACH preamble, but the same CP and GT as the RACH preamble.

Figure 5:
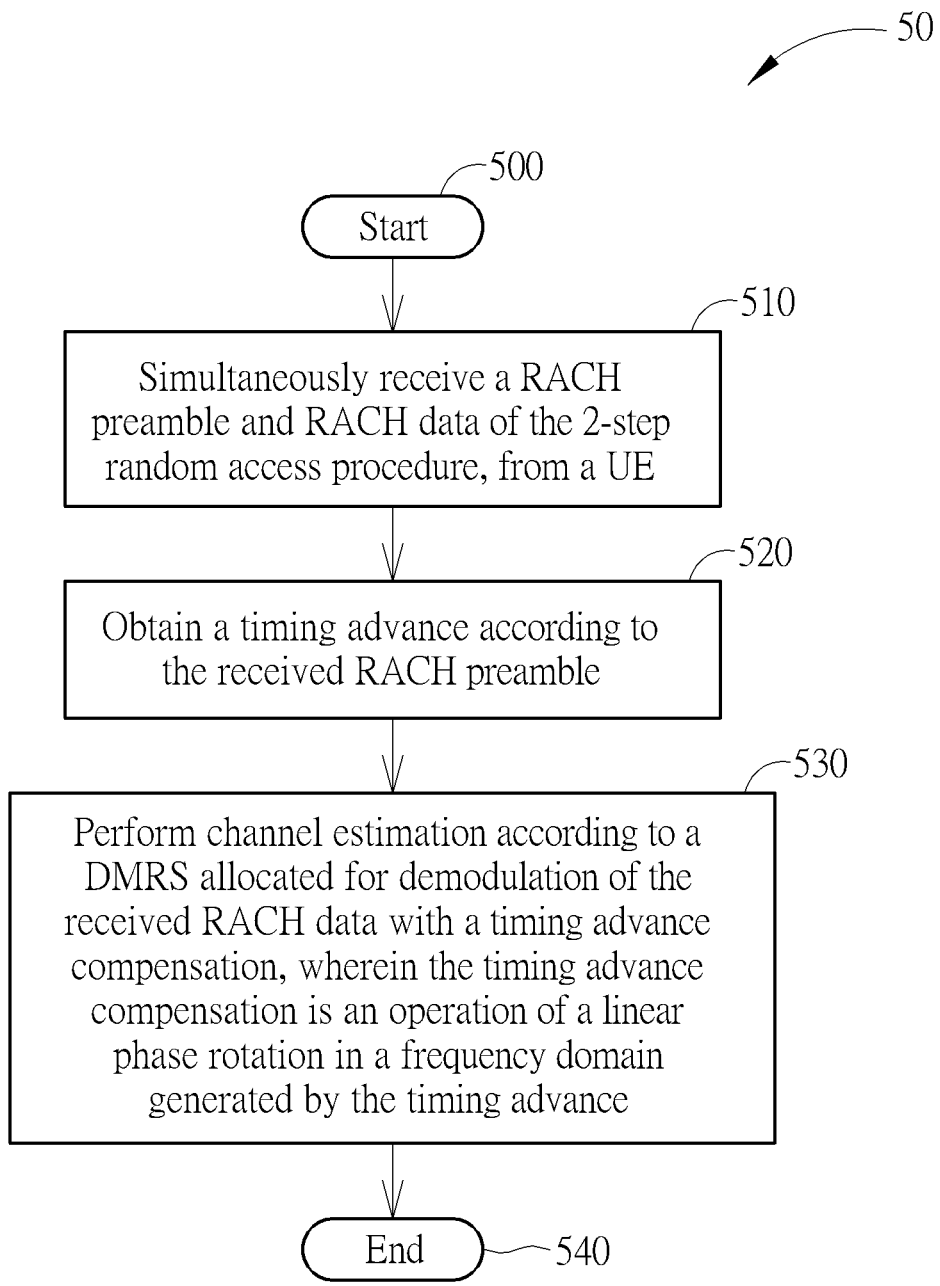
FIG. 5 is a flowchart of an exemplary process according to the present disclosure.

Please refer to FIG. 5, which is a flowchart of a process 50 according to an example of the present disclosure. The process 50 may be utilized in the network of FIG. 2 for RACH data reception. The process 50 may be compiled into the program code 214 to be stored in the storage unit 210 for being processed by the processing unit 200, and may include the following steps:

Step 500: Start.

Step 510: Simultaneously (e.g., by detecting one single message) receive a RACH preamble and RACH data of the 2-step random access procedure, from a UE.

Step 520: Obtain a timing advance according to the received RACH preamble.

Step 530: Perform channel estimation according to a DMRS allocated for demodulation of the received RACH data with a timing advance compensation, wherein the timing advance compensation is an operation of a linear phase rotation in a frequency domain generated by the timing advance.

Step 540: End.

According to the process 50, the network estimates channels not only with a DMRS sequence but also the timing advance (TA) compensation operation. In detail, due to 2-step RACH procedure, the UE transmits RACH data in asynchronous scenario. Thus, a total channel delay for the RACH data transmission includes propagation delay (i.e., timing advance) and multipath delay spread. In order to cover the total channel delay for accurate channel estimation, the network requires more DMRS allocation in frequency resource, namely high DMRS density. However, high DMRS density in frequency resource results in overhead. With TA compensation of the present invention, the timing advance can be recovered, and thus the total channel delay includes only the multipath delay spread. Consequently, the network requires less DMRS allocation in frequency resource for channel estimation, so as to reduce the DMRS density and uplink DMRS overhead.

Figure 6:
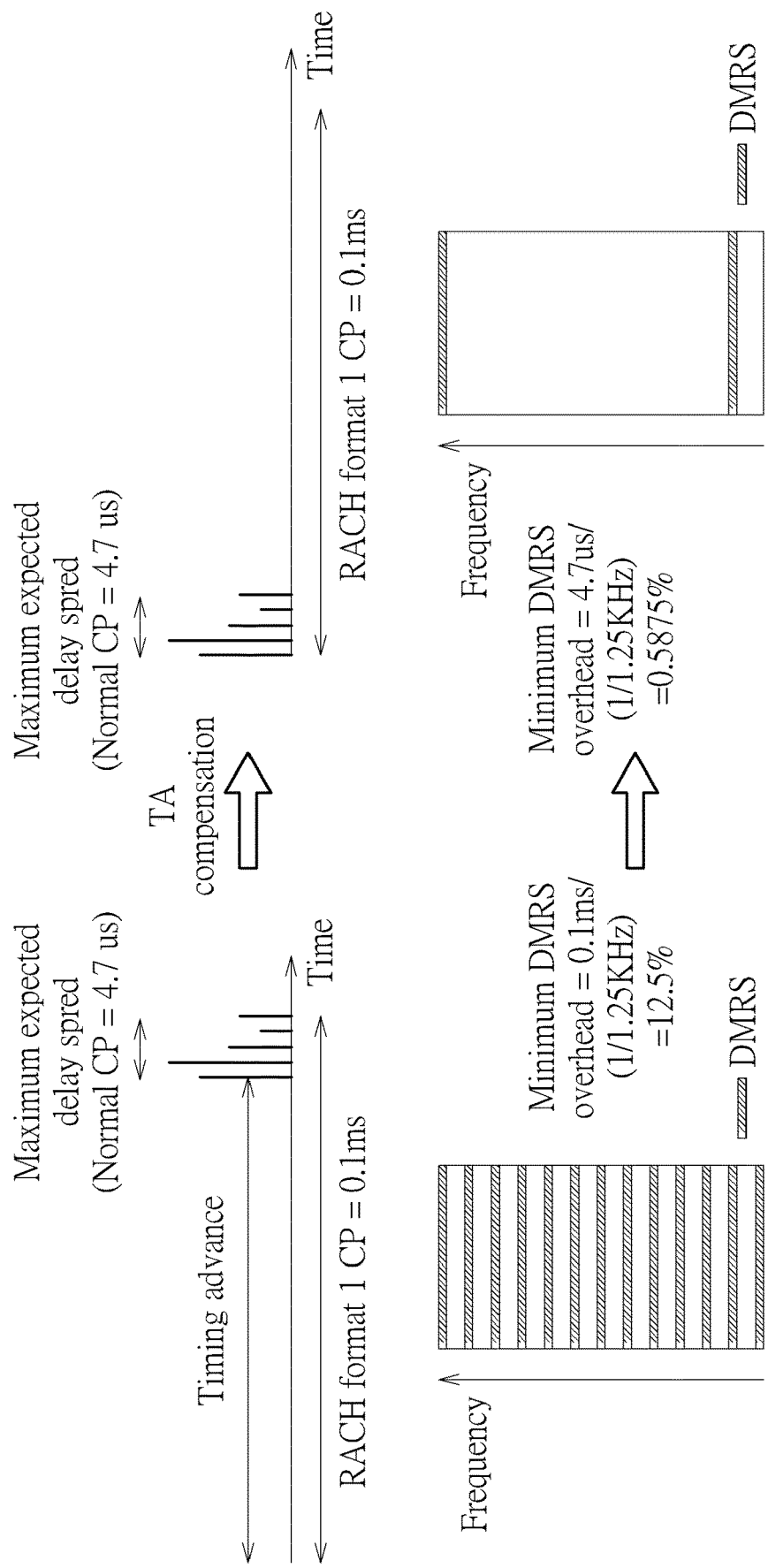
FIG. 6 is a schematic diagram of DMRS density reduction with a timing advance compensation operation according to the present disclosure.

Reference is made to FIG. 6, which illustrates DMRS density reduction with TA compensation operation according to the present disclosure. As shown in FIG. 6, the CP length in asynchronous scenario is 0.1 ms, namely the multipath delay spread toleration is maximum to 0.1 ms. As abovementioned, the total channel delay in asynchronous scenario includes the timing advance plus multipath delay spread, which is the maximum of 4.7 us (i.e. the CP length is 4.7 us in conventional synchronous scenario for data transmission). Due to a longer time delay, namely CP=100 us, the network (i.e. base station) requires higher DMRS density in frequency resource for channel estimation, which means the frequency resource is occupied by the DMRS and cannot be used for RACH data transmission, and therefore degrading the system performance.

On the other hand, the present invention proposes TA compensation operation to recover a part of propagation delay, namely the timing advance part. Thus, the channel delay remains only the multipath delay spread part, namely CP=4.7 us. Therefore, the network requires lower DMRS density in frequency resource for channel estimation. In addition, the DRMS overhead can be reduced from 12.5% to 0.5875%. In detail, the TA compensation is accomplished by the accompanied RACH preamble. The network knows the timing advance by the RACH preamble, and then uses this timing advance information to generate a compensated phase for linear phase rotator in frequency domain, which is represented as the following formula:

$$\text{theta}(k)=ta\_phase*k, \ k \text{ is subcarrier index;}$$

ta_phase is estimated from RACH preamble.

Figure 7:
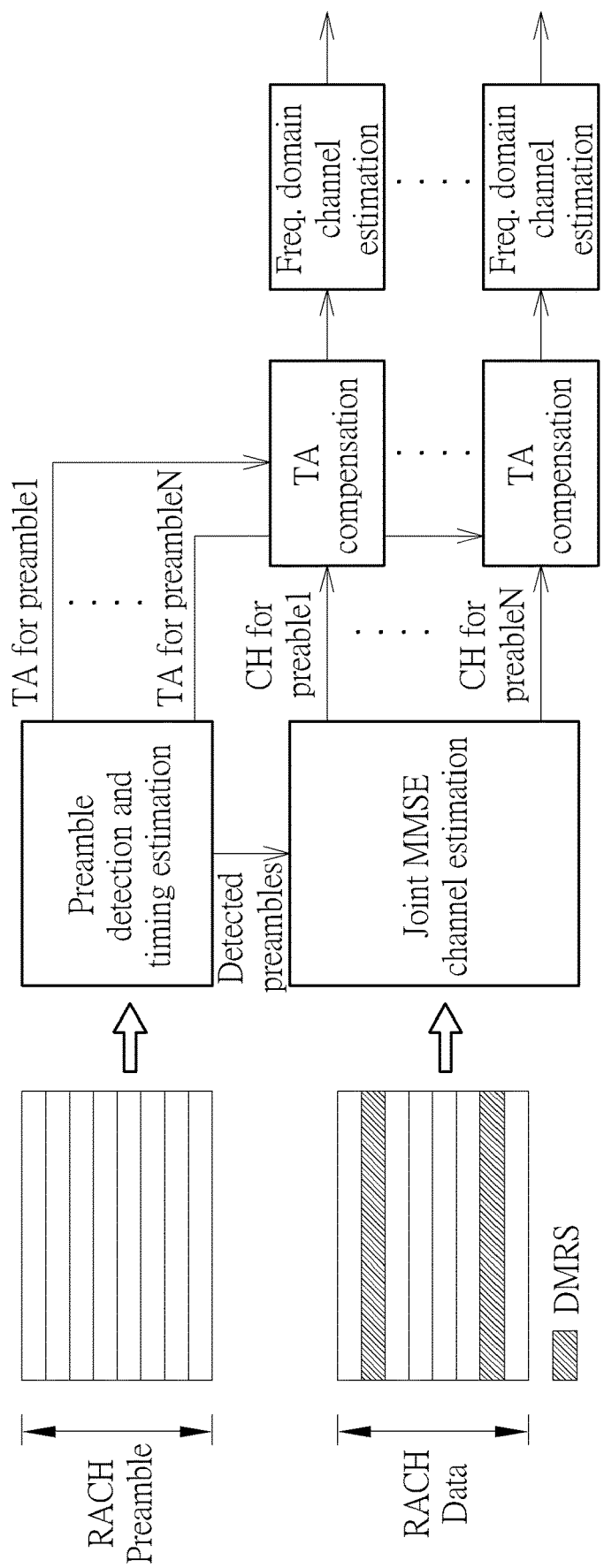
FIGS. 7-8 are schematic diagrams of a configuration of DMRS sequences according to the present disclosure.

Moreover, please refer to FIG. 7 for channel estimation procedure of the present invention. The UE transmits RACH preamble and RACH data in time-frequency resources allocated by the network. After receiving the RACH preamble, the network obtains TA values for the detected RACH preambles each corresponding to a UE. Meanwhile, the network receives the RACH data with the DMRS in some subcarriers of a physical resource block (PRB), and then performs minimum mean-square error (MMSE) channel estimation to obtain the channels with the allocated DMRS (namely channels marked with oblique line). After obtaining the channels and the TA values, the network performs TA compensation operation "theta (k)" on the obtained channels of the subcarriers of the RRB. Thus, channels with no timing advance delay are obtained, and then the network performs frequency domain channel estimation based on the channels with no timing advance delay are obtained, to get accurate channel estimation result.

Figure 8:
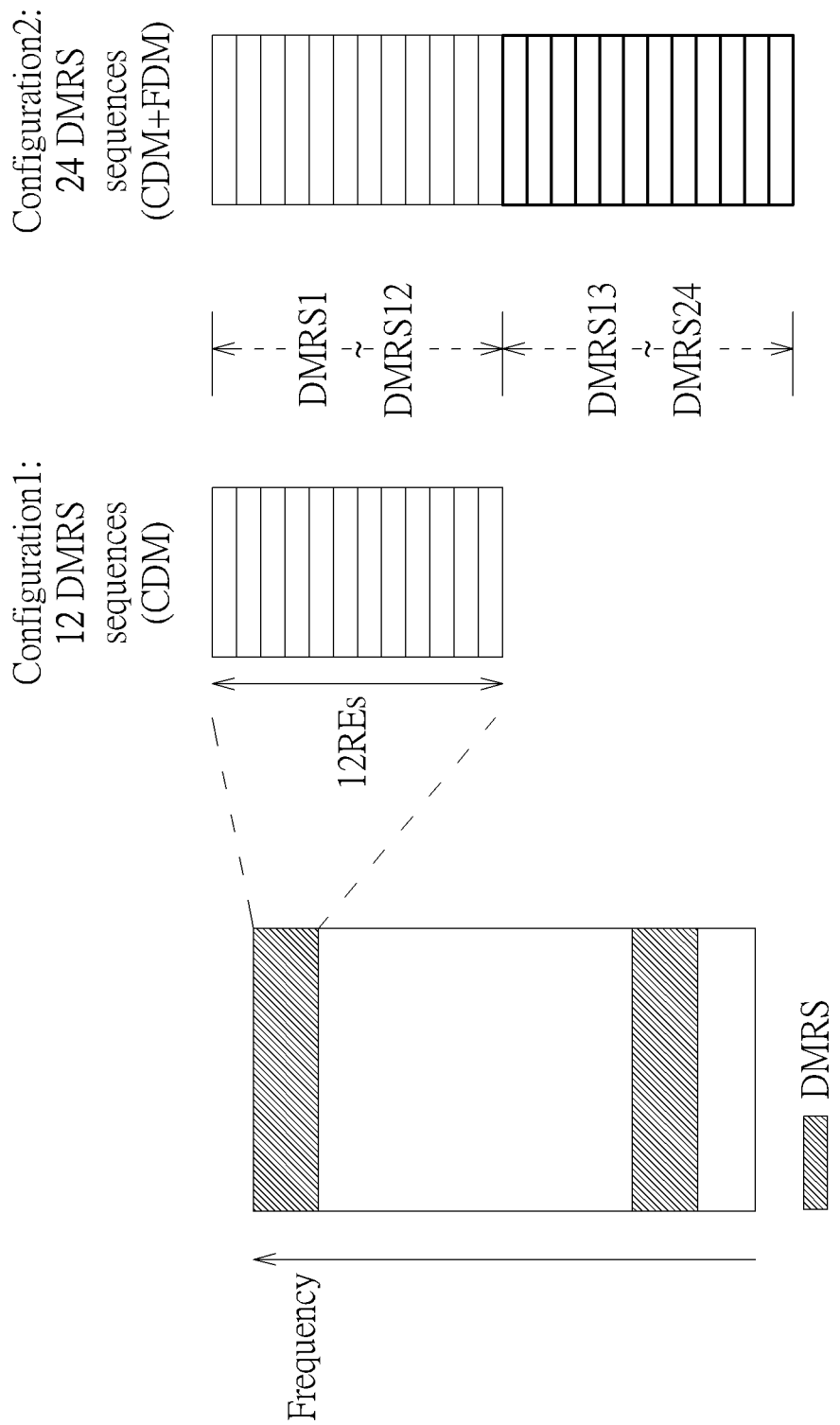
Figure 9:
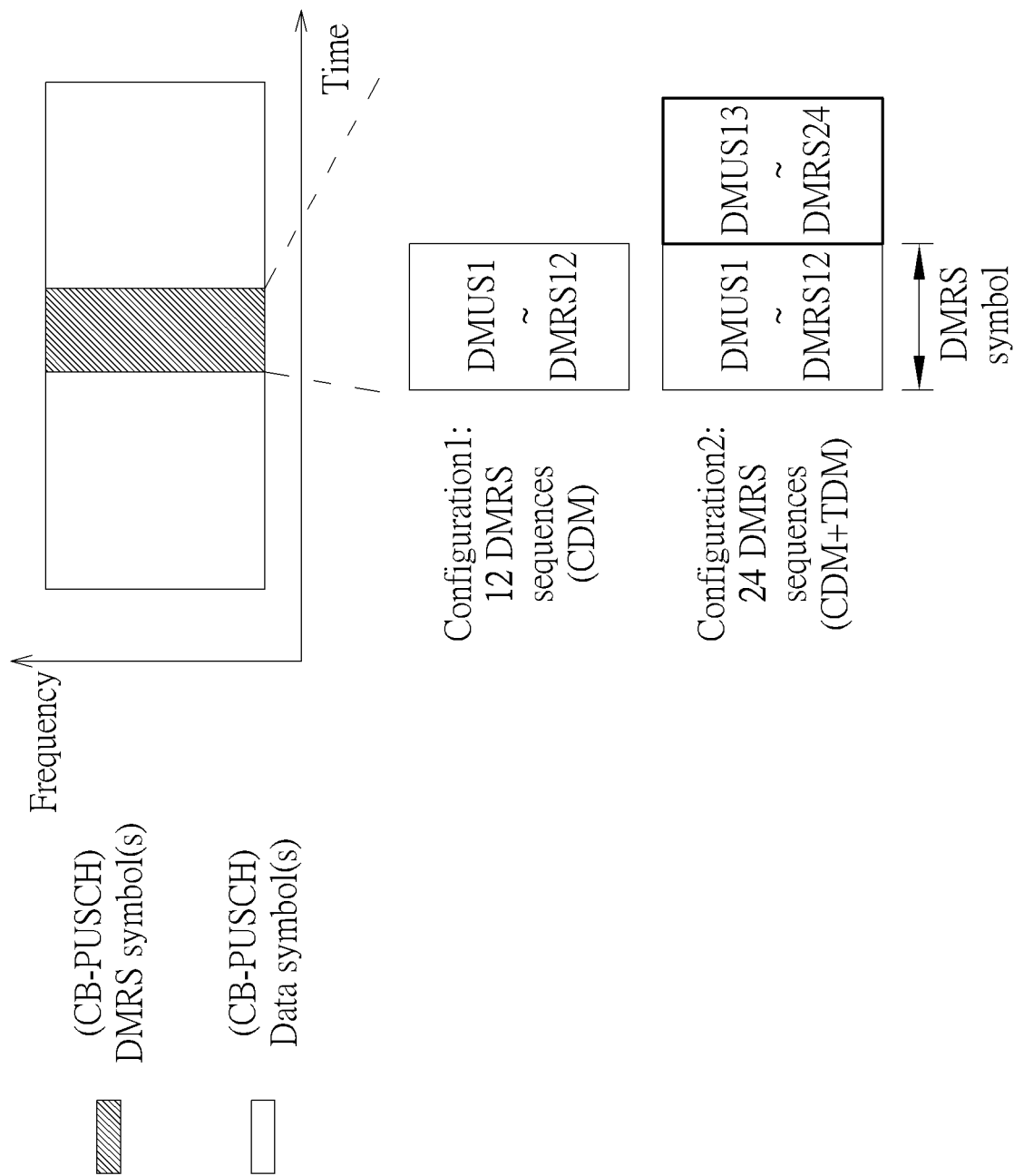
FIG. 9 is a schematic diagram of a channel estimation procedure with a timing advance compensation operation according to the present disclosure.
Figure 10:
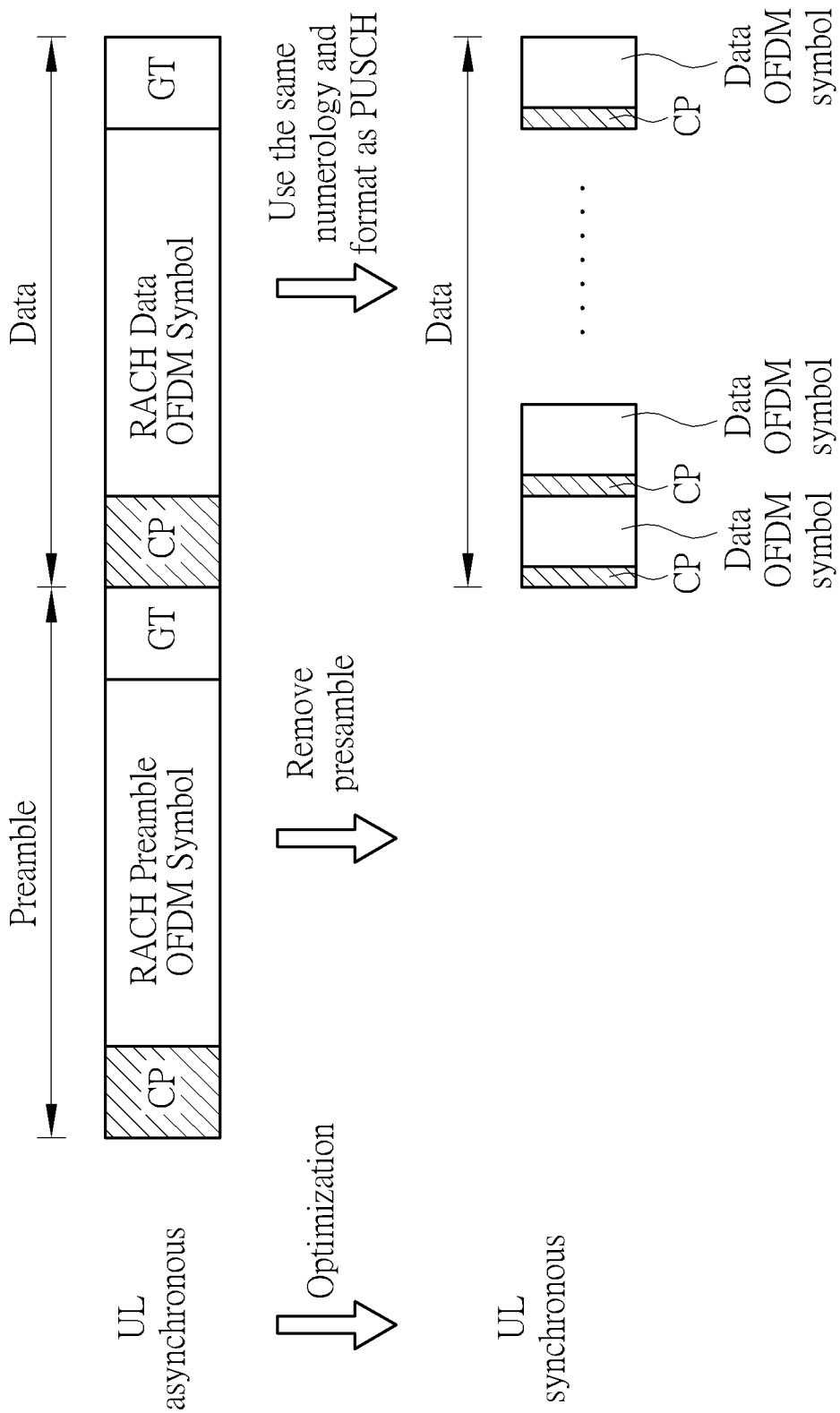
FIG. 10 is a schematic diagram of a numerology and format of RACH data according to the present disclosure.

In addition, for DMRS design, the present invention provides a way to extend DMRS capacity by means of CDM (Code-division multiplexing), FDM (Frequency-division multiplexing), TDM (Time-division multiplexing), or any combination of these three manners. In conventional LTE system, there are at most 12 REs for 12 CDM-based DMRS sequences in a PRB (i.e. DMRS multiplexed by ZC-like sequences with CDM manner). The network can reuse this structure with a number of 12 CDM-based DMRS sequences to create extra 12 DMRS sequences with FDM manner. As shown in FIG. 8, there are a number of 24 DMRS sequences can be used, and thus the network can allocate DMRS13-DMRS 24 in the next PRB in frequency resource. Similarly, in FIG. 9, the network can reuse this structure with the 12 CDM-based DMRS sequences to create extra 12 DMRS sequence with TDM manner. For example, the network can allocate DMRS13-DMRS24 in the next OFDM symbol in time resource.

Note that, if the UE knows the timing advance information when performing 2-step RACH procedure, the UE transmits uplink data by the same numerology and format as in physical uplink shared channel (PUSCH) since the UE and the network are synchronized. That is, data transmission shall utilize the same CP (e.g. CP=4.7 us), SCS and GT as for the PUSCH, rather PRACH. In addition, the UE removes the preamble signal for optimized data transmission.

The abovementioned steps of the processes/operations including suggested steps can be realized by means that could be a hardware, a software, or a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention is addressed at DMRS design for the 2-step RACH procedure, especially to DMRS configuration extension and DMRS density reduction. In addition, the present invention provides numerology and format for the RACH data transmission. Thus, data transmission and reception of 2-step RACH procedure can be realized in the 5G New Radio (NR).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for data transmission of a random access procedure for a user equipment of a wireless communication system, the method comprising:
    transmitting a preamble and data in one message of the random access procedure with configured DMRS sequences with code-division multiplexing (CDM) manner in at least a frequency resource and time resource, to a network of the wireless communication system;
    wherein the configured DMRS sequences do not consider propagation delay for a RACH data transmission;
    wherein a timing advance is compensated so that a density of the configured DMRS sequences becomes less than that before the compensation.

2. The method of claim 1, wherein the data is transmitted with a same numerology as in a physical random access channel (PRACH).

3. The method of claim 2, wherein the transmitted data has a same cyclic prefix (CP) as to the preamble, and a subcarrier spacing (SCS) for the data is the same as or different from the preamble.

4. The method of claim 2, wherein the transmitted data has a same guard time (GT) as to the preamble, and a subcarrier spacing (SCS) for the data is the same as or different from the preamble.

5. The method of claim 2, wherein the transmitted data has a same subcarrier spacing (SCS) as to the preamble.

6. The method of claim 1, wherein the timing advance is compensated by obtaining timing advance information according to the preamble, and performing channel estimation according to a DMRS allocated for demodulation of the data with a timing advance compensation, wherein the timing advance compensation is an operation of a linear phase rotation in a frequency domain.

7. A method for data transmission of a random access procedure for a user equipment of a wireless communication system, the method comprising:
    transmitting a preamble and data in one message of the random access procedure with configured DMRS sequences, to a network of the wireless communication system;
    wherein a timing advance is compensated so that a density of the configured DMRS sequences becomes less than that before the compensation.

8. The method of claim 7, wherein the data is transmitted with a same numerology as in a physical random access channel (PRACH).

9. The method of claim 8, wherein the transmitted data has a same cyclic prefix (CP) as to the preamble, and a subcarrier spacing (SCS) for the data is the same as or different from the preamble.

10. The method of claim 8, wherein the transmitted data has a same guard time (GT) as to the preamble, and a subcarrier spacing (SCS) for the data is the same as or different from the preamble.

11. The method of claim 8, wherein the transmitted data has a same subcarrier spacing (SCS) as to the preamble.

12. The method of claim 7, wherein the timing advance is compensated by obtaining timing advance information according to the preamble, and performing channel estimation according to a DMRS allocated for demodulation of the data with a timing advance compensation, wherein the timing advance compensation is an operation of a linear phase rotation in a frequency domain.

13. The method of claim 7, wherein the configured DMRS sequences do not consider propagation delay for a RACH data transmission.

* * * * *